(12) United States Patent
Kishinami et al.

(10) Patent No.: US 7,309,868 B2
(45) Date of Patent: Dec. 18, 2007

(54) RADIATION IMAGE CONVERSION PANEL AND MANUFACTURING METHOD THEREOF

(75) Inventors: Katsuya Kishinami, Tokyo (JP); Tadahiro Nagasawa, Tokyo (JP)

(73) Assignee: Konica Minolta Medical and Graphic, Inc. (JP)

( * ) Notice: Subject to any disclaimer, the term of this patent is extended or adjusted under 35 U.S.C. 154(b) by 0 days.

(21) Appl. No.: 11/506,006

(22) Filed: Aug. 17, 2006

(65) Prior Publication Data

US 2007/0045565 A1 Mar. 1, 2007

(30) Foreign Application Priority Data

Aug. 23, 2005 (JP) ............................ 2005-240945

(51) Int. Cl.
*H05B 33/00* (2006.01)

(52) U.S. Cl. .................................... 250/484.4

(58) Field of Classification Search ............. 250/484.4
See application file for complete search history.

(56) References Cited

U.S. PATENT DOCUMENTS

| 5,796,108 A * | 8/1998 | Fleming et al. ............. 250/368 |
| 2004/0191692 A1 * | 9/2004 | Sawada et al. ............. 430/302 |
| 2005/0003295 A1 * | 1/2005 | Koninckx et al. .......... 430/139 |

FOREIGN PATENT DOCUMENTS

JP 5-128509 5/1993

* cited by examiner

*Primary Examiner*—David Porta
*Assistant Examiner*—David S. Baker
(74) *Attorney, Agent, or Firm*—Cantor Colburn LLP

(57) ABSTRACT

An object is to provide a radiation image conversion panel minimizing deterioration of sensitivity and sharpness due to improved moisture resistance, as well as a method of preparing a radiation image conversion panel exhibiting high production efficiency. Also disclosed is a radiation image conversion panel possessing a support having thereon at least a stimulable phosphor layer, wherein an average height of burr generated on the radiation image conversion panel is 1-400 μm.

9 Claims, 3 Drawing Sheets

RADIATION IMAGE CONVERSION PANEL AND MANUFACTURING METHOD THEREOF

This application claims priority from Japanese Patent Application No. 2005-240945 filed on Aug. 23, 2005, which is incorporated hereinto by reference.

TECHNICAL FIELD

The present invention relates to a radiation image conversion panel and a manufacturing method thereof.

BACKGROUND

In recent years, a method of creating radiation images has been utilized employing a radiation image conversion panel possessing a stimulable phosphor.

It is a process of employing a radiation image conversion panel possessing a stimulable phosphor layer provided on a support as disclosed in the U.S. Pat. No. 3,859,527 and Japanese Patent O.P.I. Publication No. 55-12144, for example. A stimulable phosphor layer in the radiation image conversion panel is exposed to the radiation passing through an object, so as to store radiation energy corresponding to the radiation transmittance of each portion of the object to form a latent image (stored image), the radiation energy stored at each portion is radiated by scanning this stimulable phosphor layer by stimulated emission light (laser light used in this case) to be converted into light, and the strong or weak light intensity is read to obtain an image. This image may be reproduced on various kinds of displays such as a CRT and so forth, or may be reproduced as a printed copy.

It is demanded that a stimulable phosphor layer in a radiation image conversion panel utilized in this radiation image conversion method exhibits high radiation absorptance and light conversion efficiency, together with excellent graininess of an image and high sharpness.

In order to improve radiation sensitivity, it is preferred commonly to make the stimulable phosphor layer thicker. The thinner the stimulable phosphor layer is, the higher the sensitivity, but the sensitivity drops largely if the layer is too thin.

Since graininess of an image depends on location-fluctuation of the radiation quantum number (quantum mottles), structure-fluctuation (structure mottles) of a stimulable phosphor layer in a radiation image conversion panel or such, images are deteriorated by increasing quantum mottles via reduction of the radiation quantum number absorbed in the stimulable phosphor layer when the layer becomes thinner, or increasing structure mottles via elicitation of the structure-fluctuation. Accordingly, it was desired that the thick stimulable phosphor layer was used in order to improve graininess of an image.

The image quality and sensitivity in the radiation image conversion method employing a radiation image conversion panel are determined through various factors as described above. Though various studies and trials to improve these image quality and sensitivity have intensively been done by adjusting plural factors relating to them, still not much satisfactory outcome has been obtained.

On the other hand, there were problems to be improved in view of preparation of a radiation image conversion panel. In order to have a stimulable phosphor provided on a support, a vapor deposition method has been utilized in recent years in place of a conventional coating method, since a coating material contains components making no contribution to luminescence such as binder and so forth. It has been known, however, that burr generated at support ends of the radiation image conversion panel deteriorates a moisture resistance property, resulting in degradation of a moisture resistance film, and also causes a problem when a support cut in a panel size in advance is used.

A stimulable phosphor usable in a radiation image conversion panel generally exhibits a large moisture absorption property, and is deteriorated as time passes, since moisture in the air is absorbed in the case of standing in a room under the regular climate condition. When a stimulable phosphor is placed at high humidity, for example, radiation sensitivity of the foregoing phosphor drops with increase of absorbed moisture. Generally, a latent image of a radiation image recorded in a stimulable phosphor is also regressed as time passes after radiation exposure. Thus, the regressing speed of the foregoing latent image becomes large as the stimulable phosphor absorbs moisture, though there exists a characteristic in which intensity of a reproduced radiation image signal becomes smaller with a longer time from radiation exposure to scanning by stimulating light. Therefore, reproduction of a reproduced signal during reading the radiation image drops in the case of employing a radiation image conversion panel possessing a moisture-absorbed stimulable phosphor.

Further, in the case of forming a stimulable phosphor layer on a support inside a vacuum apparatus by an evaporation method and the like, it has been a problem to be solved to improve production efficiency of a radiation image conversion panel, since a ratio of the crystal-formed amount adhering to a support, based on the phosphor amount evaporated from a crucible is as small as 3-10%. Particularly, in order to prepare several sizes of radiation image conversion panels efficiently, a stimulable phosphor layer was formed on a support having the area where a plurality of radiation image conversion panels can be occupied. Subsequently, each of radiation image conversion panels was cut in a desired dimensional size employing laser cutting, punching or another technique to prepare a plurality of radiation image conversion panels. In the case of preparation employing these techniques, the similar problem caused by burr appeared.

When a radiation image conversion plate (a plate having a phosphor layer provided on a support) was tried to be cut by shirring or such, there was a problem such that the plate was deformed, and the phosphor layer was peeled from the support, and there was another problem such that high burr was generated during cutting. In the case of the burr being too high (in the case of average height of burr exceeding 400 μm), when the direction in which burr is generated is vertical to the panel surface and is on the phosphor layer side, images are deteriorated because of peeling of the phosphor layer, and when the direction is opposite (the direction in which burr is generated is vertical to the panel surface and is on the support side), a moisture resistance film to moisture-prevent a radiation image conversion panel is deteriorated. These are not preferable.

Further, it is not preferable that a cutting speed when using a diamond cutter is slow, and electrolyte is also used in the case of employing a cutting process such as electrostatic processing and so forth.

After forming a recording layer (a magnetic recording layer, an optical recording layer, or a magneto-optic recording layer) and a protective layer provided on a large support, a method of preparing a plurality of recording media by cutting these layers via laser cutting, electrical discharge machining or machining is disclosed in Patent Document 1, but it is not associated with radiation image conversions.

(Patent Document 1) Japanese Patent O.P.I. Publication No. 5-128509

SUMMARY

The present invention was made on the basis of the above-described situation. It is an object of the present invention to provide a radiation image conversion panel minimizing deterioration of sensitivity and sharpness due to improved moisture resistance, as well as a method of preparing a radiation image conversion panel exhibiting high production efficiency. Also disclosed is a radiation image conversion panel possessing a support having thereon at least a stimulable phosphor layer, wherein an average height of burr generated in the radiation image conversion panel is 1-400 μm.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DESCRIPTION OF THE PREFERRED EMBODIMENTS

Figure 1:
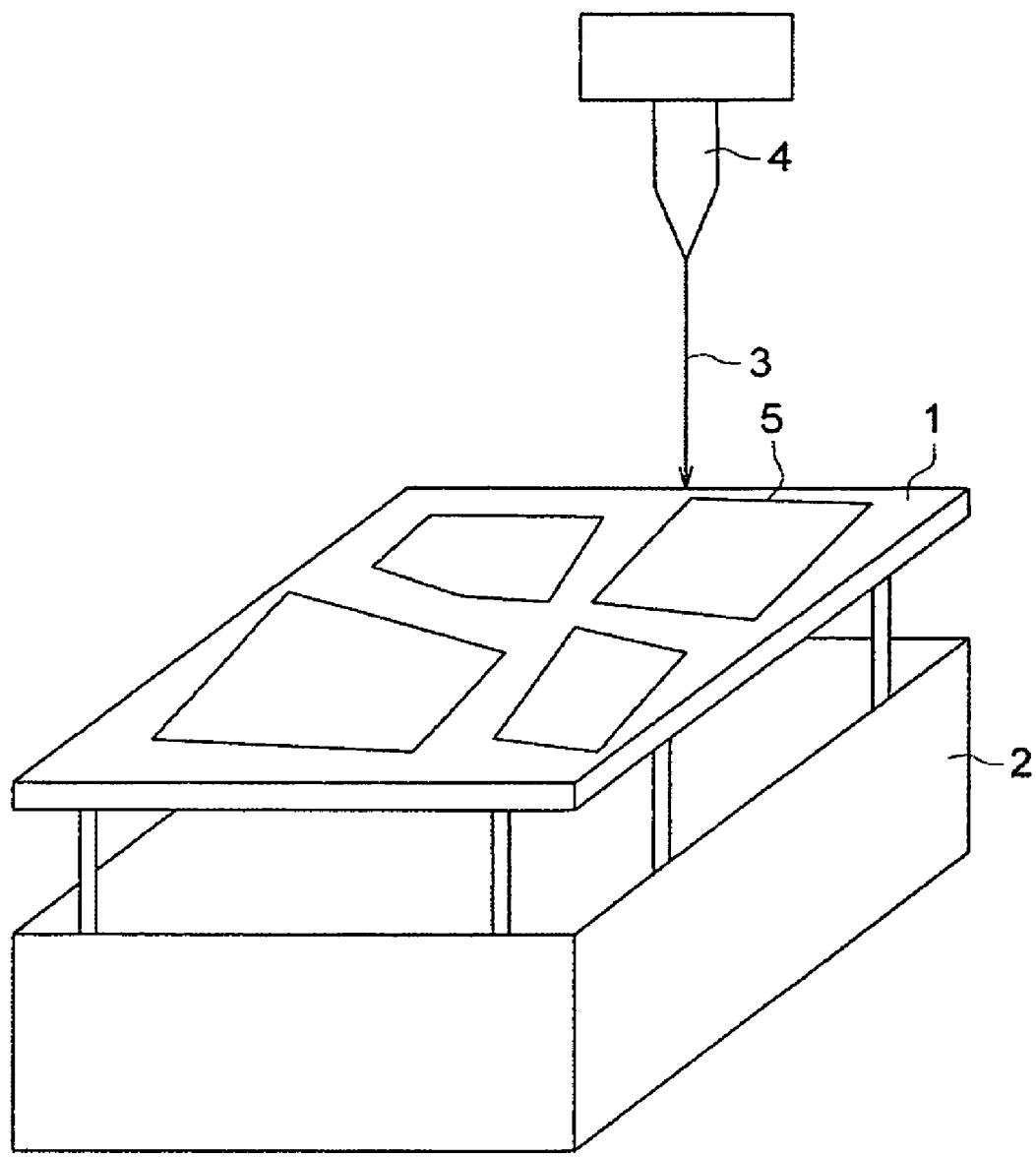
FIG. 1 is a schematic diagram showing processing equipment for laser-cutting a large size radiation image conversion panel as an example of the manufacturing method in the present invention.

The above object of the present invention is accomplished by the following structures.

(Structure 1) A radiation image conversion panel possessing a support having thereon at least a stimulable phosphor layer, wherein an average height of burr generated on the radiation image conversion panel is 1-400 μm.

(Structure 2) The radiation image conversion panel of Structure 1, wherein the stimulable phosphor layer is formed by a vapor deposition method.

(Structure 3) The radiation image conversion panel of Structure 1 or 2, wherein the support is an aluminum plate or a resin plate, and a phosphor contained in the stimulable phosphor layer is expressed by following General Formula (1).

$$CsX:yA \qquad \text{General Formula (1)}$$

where X represents Cl, Br or I, A represents Eu, Sm, In, Tl, Ga or Ce, and y is a numerical value of $1\times10^{-7}-1\times10^{-2}$.

(Structure 4) The radiation image conversion panel of any one of Structures 1-3, wherein a direction in which burr is generated is on the stimulable phosphor layer side.

(Structure 5) A method of manufacturing the radiation image conversion panel of Structures 1-4, the method possessing the steps of forming at least a stimulable phosphor layer on a support having an area of a plurality of radiation image conversion panels via a vapor deposition method to prepare radiation image conversion plates, and cutting each of radiation image conversion plates in a desired dimensional size from a support side of the radiation image conversion plate to manufacture a plurality of radiation image conversion panels.

(Structure 6) The method of Structure 5, wherein the radiation image conversion plates are cut by a carbon dioxide gas laser.

(Structure 7) The method of Structure 6, wherein the carbon dioxide gas laser has a laser power of 50-1500 W and a cutting speed of 50-3000 mm/min.

(Structure 8) The method of Structure 5, wherein cutting is conducted via a punching process.

(Structure 9) The method of Structure 8, wherein cutting is conducted at a blade edge angle of an upper blade of 15-45° by the punching process.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

After considerable effort during intensive studies, the inventors have found out that a radiation image conversion panel comprising a support having thereon at least a stimulable phosphor layer, wherein an average height of burr generated on the radiation image conversion panel is 1-400 μm, minimizes deterioration of sensitivity and sharpness due to improved moisture resistance.

A plurality of radiation image conversion panels exhibiting high production efficiency can be manufactured via a manufacturing method possessing the steps of forming at least a stimulable phosphor layer on a support having an area of a plurality of radiation image conversion panels via a vapor deposition method to prepare radiation image conversion plates (each plate having a stimulable phosphor provided on a support), and cutting each of radiation image conversion plates in a desired dimensional size from a support side of the radiation image conversion plate. The present invention has a feature of the height of burr generated in the direction vertical to the radiation image conversion panel surface, and a plurality of radiation image conversion panels obtained via cutting of a large size plate can be manufactured.

A radiation image conversion panel of the present invention possesses a support, a stimulable phosphor (hereinafter, simply referred to also as a phosphor layer) provided on the support, and a protective layer to protect the phosphor layer (a moisture resistance film). It is preferred that the phosphor layer is a layer having columnar crystals made of a stimulable phosphor (hereinafter, simply referred to also as a phosphor), which are formed by the after-described vapor deposition method.

After making studies of the method of manufacturing a plurality of radiation image conversion panels by cutting radiation image conversion plates via various cutting methods, the inventors have found out that cutting can be conducted with neither plate deformation nor peeling of a phosphor layer on the outer side of a cutting portion by a cutting method employing a laser cutting apparatus or a punching machine to obtain a plurality of radiation image conversion panels from one large size radiation image conversion plate, and the burr height is also suppressed to a satisfactory level with no problem.

An average height of burr is required to be 1-400 μm as a height of burr generated in the radiation image conversion panel after cutting, depending on material quality, in order to suppress peeling of the phosphor layer and adverse effects to the moisture resistance film, and preferably to be 6-100 μm. The average height of burr is a mean value of highest 10 burrs of burrs generated in cut sides of the radiation image conversion plate.

Regarding the cutting direction, it is preferable to cut the radiation image conversion plate from the support side, since the cut surface of the phosphor layer becomes smooth. In this method, burr is generated in the direction on the stimulable phosphor layer side. In the case of cutting from the phosphor layer side, adverse effects such as no cut surface smoothness and destruction of crystals around the phosphor layer surface located adjacent to the cut surface tend to be presented.

(Laser Cutting)

FIG. 1 is a schematic diagram showing processing equipment for laser-cutting a large size radiation image conversion panel as an example of the manufacturing method in the present invention. Incidentally, in FIG. 1, numerals 1, 2, 3, 4 and 5 represent a radiation image conversion plate, a fixator of the radiation image conversion plate, a laser beam, a laser beam machine and a cut radiation image conversion plate, respectively.

In the case of laser cutting, various kinds of lasers such as a carbon dioxide gas laser, a YAG laser, a red laser, an excimer laser and so forth are usable, but a carbon dioxide gas laser is preferable in view of an excellent cutting speed and no adverse effect caused by impurities to a radiation image conversion panel.

Further, in the case of a support having a thickness of approximately 0.05-5 mm being an aluminum plate or a resin plate, or in the case of having a resin based layer provided between a support and a phosphor layer, a carbon dioxide gas laser is particularly preferable.

In the case of the carbon dioxide gas laser, depending on frequency of the preliminary pulse, an assist gas (kind and pressure), thickness of the radiation image conversion panel and material quality of the support, a laser power of 50-1500 W is preferable, and a cutting speed of 50-3000 mm/min is also preferable.

In the case of a laser power lower than 50 W, a cutting power becomes insufficient, and in the case of a laser power higher than 1500 W, the cutting width becomes larger since the melted portions are increased, and panels are damaged because of laser heat. A laser power of 80-1200 W is more preferable.

In the case of a cutting speed slower than 50 mm/min, productivity is decreased, and in the case of a cutting speed faster than 3000 mm/min, cutting becomes impossible. A cutting speed of 100-2000 mm/min is more preferable.

An assist gas such as oxygen as an active gas, nitrogen as an inert gas, argon or air is usable, but oxygen is preferable in view of the cutting speed. A gas pressure of 10-90 N/cm$^2$ during use of oxygen as an assist gas is preferable, depending on a laser power, a cutting speed, thickness of the radiation image conversion plate and material quality of the support.

In the case of a gas pressure lower than 10 N/cm$^2$, burr is increased since the cutting ability is degraded. In the case of a gas pressure higher than 90 N/cm$^2$, running cost is expensive since cutting ability is hardly improved.

Figure 2:
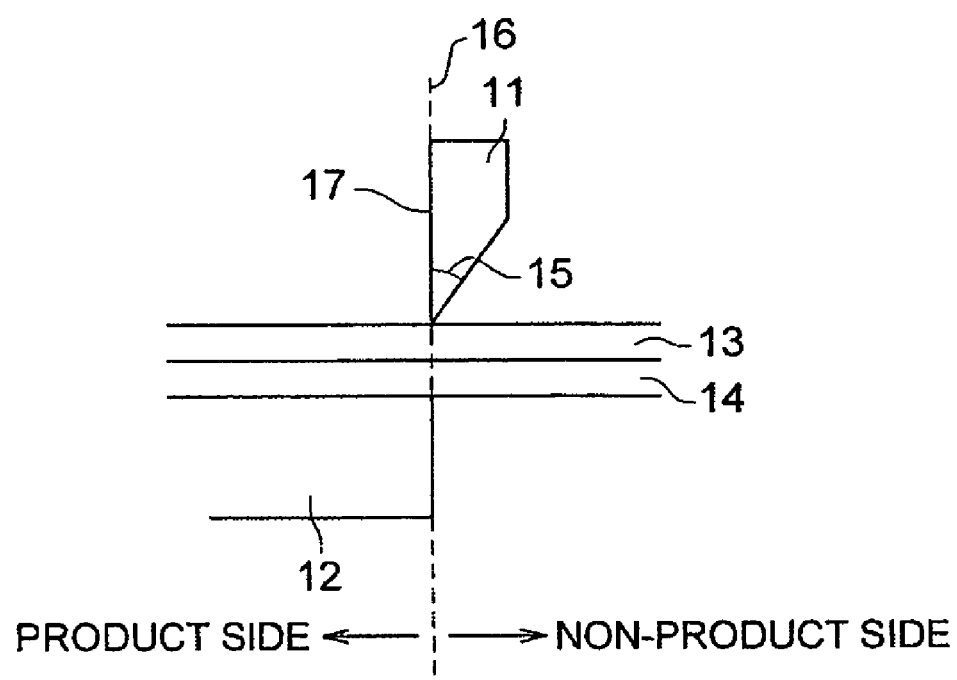
FIG. 2 is a schematic diagram showing a blade edge portion utilized for punching employed in the manufacturing method of the present invention.

FIG. 2 is a schematic diagram showing a blade edge portion utilized for punching employed in the manufacturing method of the present invention. In the case of cutting by a punching process, it is preferred in punching to cut at a blade edge angle of an upper blade of 15-45°. Since the cut portion results in less deformation in the above angle range, peeling of a phosphor layer is possible to be prevented. It is preferable that an angle between a blade surface on the product side of upper and lower blades, and a panel surface is approximately 90°. Incidentally, in FIG. 1, numerals 11, 12, 13, 14, 15, 16 and 17 represent an upper blade, a region where a lower blade is placed, a support, a phosphor layer, a blade edge angle of the upper blade, a cut surface and a blade surface, respectively.

Figure 3:
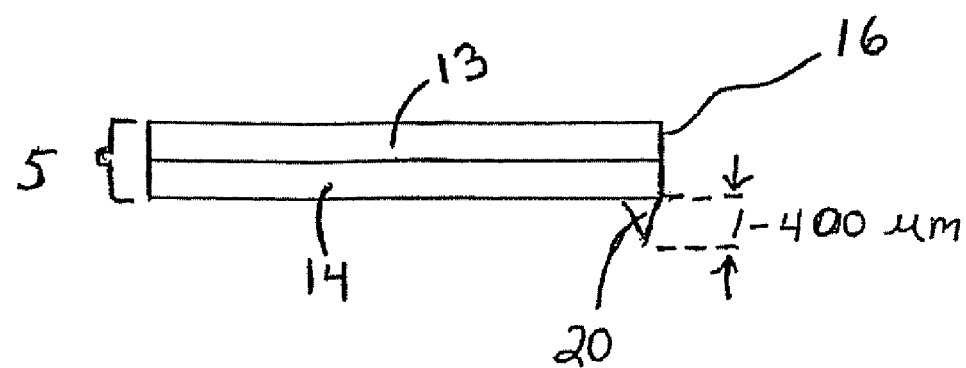
FIG. 3 is a schematic diagram showing an embodiment of the cut surface portion of a radiation image conversion panel.

FIG. 3 is a schematic diagram showing one embodiment of the cut surface portion of a radiation image conversion panel 5. As seen in FIG. 3, burr 20 is generated at the cut surface 16, or cut end, of the radiation image conversion panel 5 after the panel is cut.

Introduction of the above-described method was capable of manufacturing a radiation image conversion panel exhibiting excellent image performance accompanied with small burr.

Next, a phosphor layer, a support and so forth constituting a radiation image conversion panel of the present invention will be explained.

<<Phosphor Layer>>

Examples of phosphors used for a phosphor layer of the present invention include a phosphor represented by $BaSO_4$:Ax, as described in Japanese Patent O.P.I. Publication No. 48-80487; a phosphor represented by $MgSO_4$:Ax, as described in Japanese Patent O.P.I. Publication No. 48-80488; phosphor represented by $SrSO_4$:Ax, as described in Japanese Patent O.P.I. Publication No. 48-80489; a phosphor $Na_2SO_4$, $CaSO_4$ or $BaSO_4$ added with at least one of Mn, Dy and Tb, as described in Japanese Patent O.P.I. Publication No. 51-29889; phosphors BeO, LiF, $MgSO_4$ and $CaF_2$, as described in Japanese Patent O.P.I. Publication No. 52-30487; a phosphor $Li_2B_4O_7$:Cu, Ag, as described in Japanese Patent O.P.I. Publication No. 54-47883; and SrS:Ce, Sm, SrS:Eu, Sm, $La_2O_2S$:Eu, Sm and (Zn, Cd)S:$Mn_x$, as described in U.S. Pat. No. 3,859,527. There are also cited ZnS:Cu, Pb phosphor as described in Japanese Patent O.P.I. Publication No. 55-12142, barium aluminate phosphors represented by Formula, $BaO.xAl_2O_3$:Eu, and alkaline earth metal silicate type phosphors represented by Formula, $M^{(II)}O.xSiO_2$:A.

There are further cited an alkaline earth fluorohalide phosphor represented by Formula $(Ba_{1-x-y}Mg_xCa_y)F_x$:$Eu^{2+}$, as described in Japanese Patent O.P.I. Publication No. 55-12143; phosphor represented by Formula: LnOX:xA, as described in Japanese Patent O.P.I. Publication No. 55-12144; phosphor represented by Formula $(Ba_{1-x}M^{(II)}_x)F_x$:yA, as described in Japanese Patent O.P.I. Publication No. 55-12145; phosphor represented by Formula BaFX:xCe, yA, as described in Japanese Patent O.P.I. Publication No. 55-84389; rare earth element-activated divalent metal fluorohalide phosphor represented by Formula $M^{(II)}FX.xA$:yLn, as described in Japanese Patent O.P.I. Publication No. 55-160078; phosphor represented by Formula ZnS:A,CdS:A, (Zn,Cd)S:A, X; phosphor represented by Formulas $xM_3(PO_4)_2.NX_2$:yA and $xM_3(PO_4)_2$:yA, as described in Japanese Patent O.P.I. Publication No. 59-38278; phosphor represented by Formulas $nReX_3.mAX'_2$:xEu and $nReX_3.mAX'_2$:xEu, ySm, as described in Japanese Patent O.P.I. Publication No. 59-155487; alkali halide phosphor represented by Formula of $M^{(I)}X.aM^{(II)}X'_2.bM^{(III)}X''_3$:cA, as described in Japanese Patent O.P.I. Publication No. 61-72087; and bismuth-activated alkali halide phosphor represented by Formula of M$^{(I)}$X:xBi, as described in Japanese Patent O.P.I. Publication No. 61-228400.

An alkali halide type stimulable phosphor is preferable, and a usable stimulable phosphor represented by foregoing General Formula (1) CsX:yA is more preferable. This stimulable phosphor exhibits enhanced X-ray absorption and achieves enhanced sensitivity. Thus, enhanced sensitivity and enhanced sharpness can be achieved by forming columnar crystals under precise control. There can be employed material described in Japanese Patent Examined Publication Nos. 7-84589, 7-74334, 7-84591 and 5-01475 to prepare the phosphor.

It is preferable in the present invention that phosphor layers are prepared by a vapor deposition method.

[Preparation of a Phosphor Layer by a Vapor Deposition Method]

A vacuum evaporation method, a sputter deposition method and a CVD method are employed to allow the phosphor to perform vapor-phase growth (via a vapor deposition method) to form columnar crystals.

In such a vapor deposition method, vapor of a phosphor or raw material thereof is supplied onto a support at a specific angle toward the support to allow crystals to perform vapor-phase growth (vapor deposition) to form a phosphor layer having long, thin columnar crystals which exist independently in isolation to each other. During vacuum evaporation, the columnar crystals can be grown at a growing angle which is about half of the incident angle of the vapor stream of the phosphor.

To supply the vapor stream of a phosphor or raw material thereof at an incident angle to the support surface, the support and a crucible containing an evaporation source may be arranged to be placed so as to be inclined with each other. Alternatively, the support and the crucible which are arranged to be placed parallel to each other may be controlled so that only an inclined component from the evaporating surface of the crucible having an evaporation source deposits on the support using a slit. In such a case, the shortest spacing between the support and the crucible is preferably 10-60 cm so as to fit the average flight of the phosphor.

The thickness of the columnar crystal, i.e., the columnar crystal diameter is affected by the temperature of the support, the vacuum degree and the incident angle of the vapor stream, so that columnar crystals of a desired thickness can be prepared by controlling these factors. In cases where the incident angle of the vapor stream is greater than 0°, the columnar crystals become thinner at the greater angle, in which the preferred incident angle is 30-80°, and more preferably 30-70°. Further, in cases of the incident angle being greater than 0°, the higher vacuum forms thinner columnar crystals, in which the preferred vacuum degree is not more than 0.0013 Pa. In cases of the incident angle being 0°, the lower vacuum degree in the low vacuum region forms thinner columnar crystals, in which the preferred vacuum degree is not more than 0.13 Pa. Furthermore, a columnar crystal diameter ratio can optimally be controlled by optimally varying the temperature of the support, the vacuum degree and the incident angle of the vapor stream.

In order to enhance a modulation transfer function (MTF) of the phosphor composed of columnar crystals, the columnar crystal diameter is preferably 1-50 μm, and more preferably 1-30 μm. The columnar crystal diameter refers to a mean value of diameters of circles equivalent to areas of the section (or so-called circular equivalent diameter of the section) of the columnar crystals when viewed from the side parallel to the support surface. In the invention, the columnar crystal diameter is determined by measuring at least 100 columnar crystals in electron micrographs. Thus, the foregoing columnar crystal diameters D1 and D2 are each a mean value of columnar crystal diameters, as defined earlier, which can be determined by electron-microscopic observation of at least 100 columnar crystals. Columnar crystals thinner than 1 μm result in lowered MTF due to scattering of stimulated emission light by the columnar crystals; on the contrary, columnar crystals thicker than 50 μm result in lowered directionality of stimulated emission light, and also lowering the MTF.

The spacing between respective columnar crystals is preferably at most 30 μm, and more preferably at most 5 μm. Spacing exceeding 30 μm lowers the filling ratio of a phosphor in the phosphor layer.

The growth angle of inclined columnar crystals of the phosphor described earlier is more than 0° and not more than 90°, preferably 10-70°, and more preferably 20-55°. A growth angle of 10-70° can be achieved by an incident angle of 20-80°, and a growth angle of 20-55° can be achieved by an incident angle of 40-70°. A greater growth angle results in a columnar crystal excessively inclined toward the support, forming a brittle layer.

(Vacuum Evaporation Method)

Vacuum evaporation is conducted in such a manner that after placing a support in an evaporation apparatus, the inside of the apparatus is evacuated to a vacuum degree of 1.333×10$^{-4}$ Pa and subsequently, at least a phosphor is evaporated with heating by a resistance heating method or an electron-beam method to cause the phosphor to deposit at a slant on the surface of the support to a desired thickness. As a result, a phosphor layer containing no binder is formed, provided that the foregoing evaporation stage may be divided into plural times to form the phosphor layer. In this evaporation stage, plural resistance heaters or electron beams may be used to perform vacuum evaporation. Alternatively, phosphor raw material is evaporated using plural resistance heaters or electron beams and an intended phosphor is synthesized on the support, simultaneously forming a phosphor layer. Vacuum evaporation may be conducted while cooling or heating the substrate to be deposited thereon. After completion of vacuum evaporation, the phosphor layer may be subjected to heating treatment.

(Sputter Deposition Method)

Sputter deposition is conducted in such a manner that after setting a support in a sputtering apparatus, the inside of the apparatus is evacuated to a vacuum level of 1.333×10$^{-4}$ Pa and then inert gas used for sputtering such as Ar and Ne is introduced thereto at a gas pressure of 1.333×10$^{-1}$ Pa, subsequently, sputtering is carried out in the inclined direction by using the phosphor as a target to cause the phosphor to deposit at a slant on the surface of the support so as to have a desired thickness. Similarly to the vacuum evaporation, the sputtering stage may be divided to plural steps to form a phosphor layer. Sputtering to the target may be carried out concurrently or successively to form a phosphor layer. Using plural phosphor raw materials as a target, sputtering is simultaneously or successively carried out to form an intended phosphor layer on the support. Gas such as $O_2$ and $H_2$ may optionally introduced to perform reactive sputtering. Sputtering may be carried out while heating or cooling substrate to be deposited thereon. After completion of sputtering, the phosphor layer may be subjected to heating treatment.

(CVD Method)

CVD (Chemical vapor Deposition) is a method in which an intended phosphor or an organic compound containing a phosphor raw material is degraded using energy such as heat or high-frequency electric power to form a phosphor layer containing no binder on the support. A phosphor layer is possible to be vapor-deposited in such a way that long, thin columnar crystals at a specific angle to the line normal to the surface of the support, which exist independently in isolation to each other, are obtained.

(Phosphor Layer Thickness)

The thickness of the thus formed phosphor layer, depending on radiation sensitivity to radiation of an intended radiation image conversion panel and the kind of phosphor, is preferably 10-1000 μm, and more preferably 20-800 μm.

In the formation of a phosphor layer by the above-described vapor deposition method, a phosphor as an evaporation source may be melted homogeneously or molded by a press or hot-press, followed by being charged into a crucible. Further, it is preferred to conduct degassing treatment. Evaporation of a phosphor from the evaporation source can be conducted by scanning with electron beams ejected from an electron gun but other methods may be applied to perform the evaporation.

The evaporation source is not necessarily a phosphor and phosphor raw material may be mixed thereto.

With respect to activators, a mixture of an activator with basic substance may be evaporated. Alternatively, the basic substance is evaporated, followed by doping the activator. For example, RbBr, as basic substance is evaporated alone, followed by doping Tl as an activator. In this case, since respective crystals exist independently in isolation to each other, doping becomes feasible even in the case of a thick phosphor layer and difficulty of proceeding crystal growth results in no reduction of MTF.

Doping is performed by allowing a doping agent (activator) to be introduced into the basic substance layer of a phosphor by means of thermal diffusion or ion injection.

The phosphor layer formed on the support contains no binder, leading to superior directionality and enhanced directionality of stimulated emission light and stimulated luminescence, and enabling formation of a thicker phosphor layer, as compared to a radiation image conversion panel having a dispersion-type phosphor layer, in which a phosphor is dispersed in a binder. Moreover, reduced scattering of stimulated emission light in the phosphor layer results in enhanced sharpness.

Further, spacing between columnar crystals may be filled with a filler such as a binder to strengthen the phosphor layer. Furthermore, material exhibiting relatively high light absorbance or high reflectance may be used as filler. The use thereof prevents lateral diffusion of stimulated emission light entering into the phosphor layer, in addition to the foregoing strengthening effect.

The material exhibiting high reflectance refers to one exhibiting a high reflectance with respect to stimulated emission light (500-900 nm, specifically 600-800 nm), including metals such as aluminum, magnesium, silver and indium, white pigments and colorants ranging green to red.

White pigments can also reflect stimulated luminescence. Examples thereof include $TiO_2$ (anatase type, rutile type), MgO, $PbCO_3$, $Pb(OH)_2$, $BaSO_4$, $Al_2O_3$, $M^{(II)}FX$ [in which $M^{(II)}$ is at least one of Ba, Sr and Ca, X is at least one of Cl and Br], $CaCO_3$, ZnO, $Sb_2O_3$, $SiO_2$, $ZrO_2$, lithopone ($BaSO_4 \cdot ZnS$), magnesium silicate, basic lead silisulfate, and aluminum silicate. These white pigments exhibit opacifying power and have a refractive index high, whereby stimulated luminescence is easily scattered through reflection or refraction, leading to enhanced sensitivity of the radiation image conversion panel.

Examples of material exhibiting high light absorbance include carbon, chromium oxide, nickel oxide, iron oxide, and blue colorants. Of these, carbon absorbs stimulated luminescence.

Colorants may be any organic or inorganic colorants. Examples of organic colorants include Zapon Fastblue 3G (produced by Hoechst A. G.), Estrol Brillblue N-3RL (produced by Sumitomo Chemical Ind. Co. Ltd.), D6CBlue No. 1 (produced by National Aniline Co.), Spirit Blue (produced by HODOGAYA KAGAKU Co., Ltd.), Oilblue No. 603 (produced by Orient Co., Ltd.), Kiton Blue A (produced by Chiba Geigy Co.), Aisen Catironblue GLH (produced by HODOGAYA KAGAKU Co., Ltd.), Lakeblue AFH (produced by KYOWA SANGYO Co., Ltd.), Primocyanine 6GX (produced by INAHATA SANGYO o. Ltd.), Briilacid Green 6BH (produced by HODOGAYA KAGAKU Co., Ltd.), Cyanblue BNRCS (produced by Toyo Ink Co., Ltd.), and Lyonoyl Blue SL (produced by Toyo Ink Co., Ltd.). There are also cited organic metal complex colorants such as Color Index 24411, 23160, 74180, 74200, 22800, 23154, 23155, 24401, 14830, 15050, 15760, 15707, 17941, 74220, 13425, 13361, 13420, 11836, 74140, 74380, 74350 and 74460. Examples of inorganic colorants include ultramarine, cobalt blue, celureun blue, chromium oxide, and $TiO_2$—ZnO—NiO type pigments.

<<Support>>

Examples of the support include plate glass such as quartz, borosilicate glass, chemically tempered glass and crystallized glass; plastic plates or films such as a cellulose acetate film, a polyester film, a polyethylene terephthalate film, a polyamide film, a polyimide film, a triacetate film, a polycarbonate film and a syndiotactic polystyrene (SPS) film; metal plates or sheets such as an aluminum plate or sheet, an iron plate or sheet, a copper plate or sheet and a chromium plate or sheet, and a metal sheet covered with a hydrophilic particle layer. Of these, an aluminum plate or a resin plate is preferable.

In order to increase stiffness, and reduce noise caused by vibrations during reading a latent image employing laser light, a carbon fiber reinforced resin plate, a graphite plate, a composite plate in which at least one carbon fiber reinforced resin plate and a resin plate are attached together may be employed on the opposite side of a phosphor layer of an aluminum support or such.

Supports in which an aluminum foil adheres to a resin plate, or aluminum is evaporated onto a resin plate, and various other supports can be employed. Usable supports are not limited to the above-described supports.

Though the thickness of these supports depends on material quality used for a support, it is generally 50-5000 μm, but preferably 80-4000 μm in view of handling.

EXAMPLE

Next, the present invention will be explained employing examples, but the present invention is not limited thereto.

<<Preparation of Radiation Image Conversion Panel 1>>

Radiation image conversion panels having each size of phosphor layer were prepared according to a method described below.

(Preparation of Phosphor Plate)

A polyurethane resin layer (Takelac E-550, produced by Mitsui Takeda Chemicals, Inc.) as an adhesive layer was coated onto an aluminum plate (ART100, produced by Almeco S.p.A) having a size of 800 mm×800 mm and a thickness of 0.5 mm, so as to give a dry thickness of 5 μm to prepare a support.

After the support was placed at a distance of 60 cm from an evaporation source in a vacuum chamber of a conventional evaporator, an alkali halide phosphor made of CsBr: 0.001 Eu was charged in a crucible, and Ar gas was introduced into the vacuum chamber while evacuating. After a vacuum degree was adjusted to 0.1 Pa, and the support temperature was set to 80° C. Liquid temperature inside the crucible was adjusted to 750-830° C. while transporting the support in the parallel direction to the support to evaporate employing an aluminum slit, and a phosphor plate having a columnar structure with 400 μm thick was formed.

(Cutting with a Carbon Dioxide Gas Laser)

The resulting phosphor plate was placed in such a way that the support side is the laser light incidence side of a carbon dioxide gas laser cutter (carbon dioxide gas laser 1212HB1, produced by Mitsubishi Electric Corporation) to cut in the following five sizes at a cutting speed of 50 mm/min and a power of 200 W, accompanied with 40 N/cm$^2$ of oxygen as an assist gas.

Sizes of 354 mm×430.5 mm, 354 mm×354 mm, 277 mm×354 mm, 201.5 mm×252.5 mm and 252.5×303.5 mm.

(Sealing of a Moisture Resistance Sealing Film)

Laminated protective film A in the following constitution comprising an alumina evaporation polyethylene terephthalate resin layer was prepared as a protective film used for a phosphor layer in a phosphor plate.

Laminated Protective Film A: VMPET12///VMPET12///PET///CPP20

VMPET represents alumina-deposited polyethylene terephthalate (commercially available from Toyo Metalizing Co.), PET represents polyethylene terephthalate, and CPP represents casting polypropylene. The above designation "///" means a dry-lamination adhesion layer having a two-solution reaction type urethane adhesive layer thickness of 3 μm, and the numeral represented behind each of resin films means thickness (μm) of each film.

A dry-laminated film composed of a casting polypropylene (CPP) layer of 30 μm, an aluminum layer of 9 μm and a polyethylene terephthalate (PET) layer of 188 μm was prepared as a protective film provided on the support side of the phosphor plate.

Each size of phosphor plates which were cut as described above was covered with the above-described two protective films, and upper and lower moisture resistance protective films were heated and fused at the region outside of the circumference of the phosphor plate while reducing pressure to be sealed employing an impulse sealer.

A carbon fiber reinforced resin plate (0306C, produced by Toho Tenax Co., Ltd.) having a thickness 1.1 mm was attached to a phosphor plate sealed by the above-described two protective films from the aluminum support side with a two-sided tape to prepare radiation image conversion panel 1.

<<Preparation of Radiation Image Conversion Panels 2-5>>

Radiation image conversion panels 2-5 were prepared similarly to preparation of radiation image conversion panel 1, except that kinds of supports and cutting conditions were changed as shown in Table 1.

In addition, usable was a support in which polyester resin similarly to radiation image conversion panel 1 as an adhesion layer was coated on a polyimide plate (EI040201, produced by Ube Industries, Ltd.) having a thickness of 0.4 mm, used as a support of radiation image conversion panel 5.

<<Preparation of Radiation Image Conversion Panels 6 and 7>>

Radiation image conversion panels 6 and 7 were prepared similarly to preparation of radiation image conversion panel 1, except that cutting with a carbon dioxide gas laser cutter was replaced by cutting with a punching cutter (upper blade angles are shown in Table 1) to punch out from the support side.

<<Preparation of Radiation Image Conversion Panel 8>>

A polyurethane resin layer (Takelac E-550, produced by Mitsui Takeda Chemicals, Inc.) as an adhesive layer was coated onto an aluminum plate (ART100, produced by Almeco S.p.A) having a thickness of 0.5 mm, which was cut in a size of 354×430.5 mm by a punching cutter in advance, so as to give a dry thickness of 5 μm to prepare a support.

A phosphor panel possessing a columnar structure having a thickness of 400 μm was formed via evaporation onto the support in the same manner as radiation image conversion panel 1. Radiation image conversion panel 8 was prepared similarly to radiation image conversion panel 1, after sealing with moisture resistance films.

<<Preparation of Radiation Image Conversion Panel 9>>

Radiation image conversion panel 9 was prepared similarly to preparation of radiation image conversion panel 2, except that carbon dioxide gas laser cutting was conducted from the phosphor layer side of a phosphor plate.

<<Preparation of Radiation Image Conversion Panels 10 and 11>>

Radiation image conversion panels 10 and 11 were prepared similarly to radiation image conversion panel 1, except that the condition of carbon dioxide gas laser cutting of a phosphor plate was changed as shown in Table 1.

<<Preparation of Radiation Image Conversion Panels 12 and 13>>

Radiation image conversion panels 12 and 13 were prepared similarly to radiation image conversion panel 6, except that an upper blade angle of a punching cutter was changed as shown in Table 1.

TABLE 1

|  | *1 Support | *2 | Method of cutting a plate | Cutting direction | Laser power (W) | *3 | *4 | Remarks |
|---|---|---|---|---|---|---|---|---|
| 1 | Aluminum plate | — | Carbon dioxide gas laser | From the support side | 200 | 50 | — | Present Invention |
| 2 | Aluminum plate | — | Carbon dioxide gas laser | From the support side | 600 | 1000 | — | Present Invention |
| 3 | Aluminum plate | — | Carbon dioxide gas laser | From the support side | 1000 | 1900 | — | Present Invention |
| 4 | Aluminum plate | — | Carbon dioxide gas laser | From the support side | 1500 | 3000 | — | Present Invention |

TABLE 1-continued

| *1 | Support | *2 | Method of cutting a plate | Cutting direction | Laser power (W) | *3 | *4 | Remarks |
|---|---|---|---|---|---|---|---|---|
| 5 | Resin plate | — | Carbon dioxide gas laser | From the support side | 100 | 1500 | — | Present Invention |
| 6 | Aluminum plate | — | Punching | From the support side | — | — | 20 | Present Invention |
| 7 | Aluminum plate | — | Punching | From the support side | — | — | 45 | Present Invention |
| 8 | Aluminum plate | Punching | — | From the support side | — | — | 45 | Present Invention |
| 9 | Aluminum plate | — | Carbon dioxide gas laser | From the phosphor layer side | 600 | 1000 | — | Comparative example |
| 10 | Aluminum plate | — | Carbon dioxide gas laser | From the support side | 150 | 40 | — | Comparative example |
| 11 | Aluminum plate | — | Carbon dioxide gas laser | From the support side | 1700 | 3200 | — | Comparative example |
| 12 | Aluminum plate | — | Punching | From the support side | — | — | 10 | Comparative example |
| 13 | Aluminum plate | — | Punching | From the support side | — | — | 65 | Comparative example |

*1: Radiation image conversion panel No.
*2: Cutting of a support (in the case of using a support in a product size)
*3: Cutting speed (mm/min),
*4: Upper blade angle (°)

<<Evaluation of Radiation Image Conversion Panel>>

(Evaluation of Cutting Property)

The cutting property of a phosphor plate (a sheet before a radiation image conversion panel is processed) cut in a size of 354 mm×430.5 mm was evaluated as described below.

<Evaluation of Appearance>

The cut surface was observed by a microscope to evaluate according to the following criteria.
A: Burr is hardly observed, the cut surface is smooth, and no peeled phosphor layer is observed.
B: Burr is slightly observed, but the cut surface is considerably smooth and no peeled phosphor layer is observed.
D: A lot of burr is observed, no cut surface is smooth, and a lot of peeled phosphor is observed.

<Average Height of Burr>

Highest 10 burrs of burrs generated in two 354 mm sides of a phosphor plate cut in a size of 354 mm×430.5 mm were measured employing a burr checking micrometer, and the average height of burr was determined via averaging of them.

(Property Evaluation)

A radiation image conversion panel was treated at 40° C. and 90% RH for 15 days (an accelerated test) to evaluate the following properties before and after the accelerated test.

<Sensitivity>

In order to measure sensitivity, after a radiation Image conversion panel was irradiated with X-rays at a tube voltage of 80 kVp in an amount of 10 mAs at a distance of 2 m between the exposure source and the plate, the panel was placed in Regius350 to read data. Sensitivity was determined employing the resulting electrical signal received from a photomultiplier. The sensitivity is a mean value of the entire phosphor surface, and is represented by a relative value, based on that of radiation image conversion panel 1 before an accelerated test, being 1.00.

<Sharpness>

Modulation transfer function (MTF) was obtained to evaluate sharpness. A CTF chart was placed on a radiation image conversion panel. Thereafter, the resulting radiation image conversion panel was irradiated with X-rays at 80 kVp in an amount of 10 mAs (a distance to the object was 1.5 m). Subsequently, a CTF chart image was obtained by scanning reading, utilizing a 100 μmφ semiconductor laser beam (having a wavelength of 680 nm and a power of 40 mW on the panel). For sensitivity, 2.01 p/mm of a MTF value was obtained. The larger the value is, the higher the sensitivity.

The evaluation results described above are shown in Table 2.

TABLE 2

| Radiation image conversion panel No. | Cutting property | | Before an accelerated test | | After an accelerated test | | Remarks |
|---|---|---|---|---|---|---|---|
| | Appearance (Visual observation) | Average height of burr (μm) | *1 | Sharpness (%) | *1 | Sharpness (%) | |
| 1 | B | 192 | 1.00 | 37 | 0.99 | 36 | Present Invention |
| 2 | A | 83 | 1.00 | 37 | 0.99 | 36 | Present Invention |
| 3 | B | 260 | 1.00 | 37 | 0.98 | 36 | Present Invention |
| 4 | B | 375 | 1.00 | 37 | 0.97 | 35 | Present Invention |

TABLE 2-continued

| Radiation image conversion panel No. | Cutting property | | Before an accelerated test | | After an accelerated test | | Remarks |
|---|---|---|---|---|---|---|---|
| | Appearance (Visual observation) | Average height of burr (μm) | *1 | Sharpness (%) | *1 | Sharpness (%) | |
| 5 | A | 4 | 0.94 | 42 | 0.94 | 41 | Present Invention |
| 6 | B | 35 | 1.00 | 37 | 0.99 | 36 | Present Invention |
| 7 | B | 56 | 1.00 | 37 | 0.98 | 36 | Present Invention |
| 8 | B | 44 | — | — | 0.99 | 36 | Present Invention |
| 9 | D | 412 | 1.00 | 37 | 0.93 | 32 | Comparative example |
| 10 | D | 512 | 1.00 | 37 | 0.94 | 32 | Comparative example |
| 11 | D | 420 | 1.00 | 37 | 0.93 | 32 | Comparative example |
| 12 | D | 431 | 1.00 | 37 | 0.94 | 31 | Comparative example |
| 13 | D | 462 | 1.00 | 37 | 0.93 | 32 | Comparative example |

*1: Sensitivity (relative value)

As is clear from the Table 2, it is to be understood that radiation image conversion panels of the present invention not only exhibit excellent cut surfaces of the plates and high moisture resistance, but also minimize deterioration of sensitivity and sharpness caused by high humidity in comparison to those properties of comparative samples.

EFFECT OF THE INVENTION

In the present invention, provided can be a radiation image conversion panel minimizing deterioration of sensitivity and sharpness due to improved moisture resistance, as well as a method of preparing a radiation image conversion panel exhibiting high production efficiency.

What is claimed is:

1. A radiation image conversion panel comprising a support having thereon at least a stimulable phosphor layer, wherein an average height of burr generated on the radiation image conversion panel at a cut end of the radiation image conversion panel is 1-400 μm.

2. The radiation image conversion panel of claim 1, wherein the stimulable phosphor layer is formed by a vapor deposition method.

3. The radiation image conversion panel of claim 1, wherein the support is an aluminum plate or a resin plate, and a phosphor contained in the stimulable phosphor layer is expressed by following General Formula (1)

$$CsX:yA \qquad \text{General Formula (1)}$$

where X represents Cl, Br or I, A represents Eu, Sm, In, Tl, Ga or Ce, and y is a numerical value of $1\times10^{-7}$-$1\times10^{-2}$.

4. The radiation image conversion panel of claim 1, wherein a direction in which burr is generated is on the stimulable phosphor layer side.

5. A method of manufacturing the radiation image conversion panel of claim 1, the method comprising the steps of:
   (a) forming at least a stimulable phosphor layer on a support having an area of a plurality of radiation image conversion panels via a vapor deposition method to prepare radiation image conversion plates, and
   (b) cutting each of radiation image conversion plates in a desired dimensional size from a support side of the radiation image conversion plate to manufacture a plurality of radiation image conversion panels.

6. The method of claim 5, wherein the radiation image conversion plates are cut by a carbon dioxide gas laser.

7. The method of claim 6, wherein the carbon dioxide gas laser has a laser power of 50-1500 W and a cutting speed of 50-3000 mm/min.

8. The method of claim 5, wherein cutting is conducted via a punching process.

9. The method of claim 8, wherein cutting is conducted at a blade edge angle of an upper blade of 15-45° by the punching process.

* * * * *